(12) United States Patent
Vasilik

(10) Patent No.: US 8,239,489 B1
(45) Date of Patent: *Aug. 7, 2012

(54) WEB PAGE EXPERIMENTS WITH FRAGMENTED SECTION VARIATIONS

(75) Inventor: Kenneth Eric Vasilik, Bellevue, WA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/016,018

(22) Filed: Jan. 28, 2011

Related U.S. Application Data

(63) Continuation of application No. 12/036,594, filed on Feb. 25, 2008, now Pat. No. 7,895,293.

(51) Int. Cl.
*G06F 15/16* (2006.01)
(52) U.S. Cl. .................. 709/218; 709/203
(58) Field of Classification Search .............. 709/218, 709/203, 217, 245; 705/14.4, 14.1, 10, 26, 705/400; 715/234, 253, 229, 264, 277
See application file for complete search history.

(56) References Cited

U.S. PATENT DOCUMENTS

| | | | |
|---|---|---|---|
| 5,826,031 A | 10/1998 | Nielsen | |
| 5,870,559 A | 2/1999 | Leshem et al. | |
| 6,085,229 A | 7/2000 | Newman et al. | |
| 6,405,223 B1 | 6/2002 | Kelley et al. | |
| 6,605,120 B1 | 8/2003 | Fields et al. | |
| 6,625,803 B1 | 9/2003 | Massena et al. | |
| 6,721,922 B1 | 4/2004 | Walters et al. | |
| 6,826,594 B1 * | 11/2004 | Pettersen | 709/203 |
| 6,920,609 B1 | 7/2005 | Manber et al. | |
| 6,934,748 B1 | 8/2005 | Louviere et al. | |
| 7,028,001 B1 | 4/2006 | Muthuswamy et al. | |
| 7,031,932 B1 | 4/2006 | Lipsky et al. | |
| 7,039,599 B2 | 5/2006 | Merriman et al. | |
| 7,047,294 B2 | 5/2006 | Johnson et al. | |
| 7,047,318 B1 | 5/2006 | Svedloff | |
| 7,168,040 B2 | 1/2007 | Yamamoto et al. | |
| 7,194,683 B2 | 3/2007 | Hind et al. | |
| 7,370,036 B2 | 5/2008 | Vedula | |
| 7,523,087 B1 | 4/2009 | Agarwal et al. | |
| 7,594,189 B1 | 9/2009 | Walker et al. | |
| 7,747,602 B2 | 6/2010 | Sampson | |
| 7,809,725 B1 | 10/2010 | Vasilik | |
| 7,895,293 B1 | 2/2011 | Vasilik | |
| 7,895,514 B1 | 2/2011 | Edmunds et al. | |
| 2002/0042738 A1 | 4/2002 | Srinivasan et al. | |

(Continued)

OTHER PUBLICATIONS

International Search Report and Written Opinion for International Application No. PCT/US2007/069496, mailed Feb. 2, 2009, 10 pages.

(Continued)

*Primary Examiner* — Wing Chan
*Assistant Examiner* — Ruolei Zong
(74) *Attorney, Agent, or Firm* — Fish & Richardson P.C.

(57) ABSTRACT

In one general aspect, a page identifier of a test display environment having code defining a content section, the content section comprising a plurality of content section fragments, is received. A content item group is selected from a collection of content item groups, each content item group defining an association of content items with content section fragments of the content section. Each identified content item in the selected content item group is transmitted for placement on the test display environment in the associated content section fragment.

19 Claims, 12 Drawing Sheets

U.S. PATENT DOCUMENTS

| | | | |
|---|---|---|---|
| 2002/0069255 | A1 | 6/2002 | Dinovo |
| 2002/0129064 | A1 | 9/2002 | Guthrie |
| 2002/0143495 | A1 | 10/2002 | Roser |
| 2002/0165940 | A1 | 11/2002 | Kameoka et al. |
| 2002/0188508 | A1 | 12/2002 | Lee et al. |
| 2003/0097374 | A1 | 5/2003 | Himeno |
| 2003/0131106 | A1 | 7/2003 | Kasriel |
| 2003/0163784 | A1 | 8/2003 | Daniel et al. |
| 2004/0019634 | A1 | 1/2004 | Van Geldern et al. |
| 2004/0107423 | A1 | 6/2004 | Noda |
| 2004/0123247 | A1 | 6/2004 | Wachen et al. |
| 2004/0168122 | A1 | 8/2004 | Kobipalayam Murugaiyan |
| 2005/0021397 | A1 | 1/2005 | Cui et al. |
| 2005/0034065 | A1 | 2/2005 | Weight |
| 2005/0071745 | A1 | 3/2005 | Ehrich et al. |
| 2005/0071755 | A1 | 3/2005 | Harrington et al. |
| 2005/0071757 | A1 | 3/2005 | Ehrich et al. |
| 2005/0160002 | A1 | 7/2005 | Roetter et al. |
| 2005/0268229 | A1 | 12/2005 | Wessling et al. |
| 2006/0031417 | A1 | 2/2006 | Narin |
| 2006/0036400 | A1 | 2/2006 | Kasriel et al. |
| 2006/0162071 | A1 | 7/2006 | Dixon et al. |
| 2006/0173815 | A1 | 8/2006 | Vedula |
| 2006/0184638 | A1 | 8/2006 | Chua et al. |
| 2006/0218490 | A1 | 9/2006 | Fink |
| 2006/0265400 | A1 | 11/2006 | Fain et al. |
| 2006/0271671 | A1 | 11/2006 | Hansen |
| 2007/0027754 | A1 | 2/2007 | Collins et al. |
| 2007/0061700 | A1 | 3/2007 | Kothari et al. |
| 2007/0100956 | A1 | 5/2007 | Kumar |
| 2007/0124671 | A1 | 5/2007 | Hackworth et al. |
| 2007/0130510 | A1 | 6/2007 | Dharamshi et al. |
| 2007/0136255 | A1 | 6/2007 | Rizzo et al. |
| 2007/0143672 | A1 | 6/2007 | Lipton et al. |
| 2007/0150353 | A1 | 6/2007 | Krassner et al. |
| 2007/0271352 | A1 | 11/2007 | Khopkar et al. |
| 2007/0271392 | A1 | 11/2007 | Khopkar et al. |
| 2007/0271501 | A1* | 11/2007 | Vasilik .......................... 715/511 |
| 2007/0271511 | A1* | 11/2007 | Khopkar et al. .............. 715/540 |
| 2007/0276813 | A1* | 11/2007 | Rosen ............................... 707/3 |
| 2007/0299985 | A1* | 12/2007 | Craig et al. .................... 709/245 |
| 2008/0028334 | A1 | 1/2008 | De Mes |
| 2008/0046415 | A1 | 2/2008 | Henkin et al. |
| 2008/0046507 | A1 | 2/2008 | Westphal |
| 2008/0133722 | A1 | 6/2008 | Ramasundaram |
| 2009/0006192 | A1 | 1/2009 | Martinez et al. |
| 2009/0150253 | A1 | 6/2009 | Williams et al. |
| 2009/0204579 | A1 | 8/2009 | Govani et al. |
| 2009/0241015 | A1 | 9/2009 | Bender et al. |
| 2009/0300483 | A1 | 12/2009 | Viet |
| 2011/0213676 | A1 | 9/2011 | Singh |

OTHER PUBLICATIONS

Becamel, Philippe, International Preliminary Report on Patentability in PCT/US2007/069496, mailed Apr. 23, 2009, 8 pages.

Snapshot from Apr. 16, 2003, howstuffworks.com, Brain, Marshall, "How Internet Cookies Work," [online]. Retrieved from the Internet URL: http://web.archive.org/web/20030416025353/http://computer.howstuffworks.com/cookie3.htm, 2 pages.

"ProHTML ticker, Dynamic Drive," Archived Jan. 1, 2005, [online]; Retrieved from the Internet URL: http://www.dynamicdrive.com/dynamicindex2/prohtmlticker.htm, 2 pages.

Raggett et al., "HTML 4.01 Specification, W3C Recommendation," [online] [retrieved on Dec. 24, 1999]; Retrieved from the Internet URL: http://www.w3.org/TR/1999/REC-html401-19991224, 389 pages.

Snapshot from Oct. 29, 2005, Kefta—Solutions—Customer Acquisition, "Customer Acquisition—drive more customers with greater efficiency," [online]. Retrieved from the Internet URL: http://web.archive.org/web/20051029081141/www.kefta.com/optimization-solutions/customeracquisition.html, 3 pages.

Snapshot from Apr. 27, 2006, Kefta's Dynamic Targeting Solution, "It's about creating a meaningful and relevant experience for your visitors", [online]. Retrieved from the Internet URL: http://web.archive.org/web/20060427125859/www.kefta.com/overview/approach.html, 2 pages.

Snapshot from Apr. 27, 2006, Kefta—Dynamic Targeting—the next generation of website personalization, "At Kefta, we believe in delivering the best message at the best time", [online]. Retrieved from the Internet URL: http://web.archive.org/web/20060427132429/www.kefta.com/overview/index.html, 2 pages.

Snapshot from Apr. 24, 2006, Offermatica: General A/B Test Demo, "What is Offermatica?", [online]. Retrieved from the Internet URL: http://web.archive.org/web/20060422201155/www.offermatica.com/demos/ab.html, 7 pages.

Snapshot from Apr. 24, 2006, Offermatica: Hosted A/B testing, multivariate testing, and landing page optimization tools, "What is Offermatica?", [online]. Retrieved from the Internet URL: http://web.archive.org/web/20060422201114/www.offermatica.com/whatis-1.0.html, 2 pages.

Snapshot from Apr. 24, 2006, Offermatica: How it Works, [online]. Retrieved from the Internet URL: http://web.archive.org/web/20060428054148/www.offermatica.com/whatis-1.1.1.html, 1 page.

Snapshot from Apr. 28, 2006, Optimost: Improve conversion rates on any landing page, splash page, jump page, "Maximize Conversion Rates Increase Your Revenue", [online]. Retrieved from the Internet URL: http://web.archive.org/web/20060425212837/www.optimost.com/, 1 page.

Snapshot from Apr. 23, 2006, Touch Clarity—Technology, "Control Groups", [online]. Retrieved from the Internet URL: http://web.archive.org/web/20060503215906/www.touchclarity.com/technology/detail.php?id=78, 1 page.

Snapshot from Apr. 23, 2006, Touch Clarity—Technology, "Targeting Engine", [online]. Retrieved from the Internet URL: http://web.archive.org/web/20060503215705/www.touchclarity.com/technology/detail.php?id=76, 1 page.

Snapshot from Apr. 23, 2006, Touch Clarity—Technology, "Implementation", [online]. Retrieved from the Internet URL: http://web.archive.org/web/20060503215833/www.touchclarity.com/technology/detail.php?id=80, 1 page.

Snapshot from Apr. 23, 2006, Touch Clarity—Technology, "Visitor Profiling", [online]. Retrieved from the Internet URL: http://web.archive.org/web/20060503215758/www.touchclarity.com/technology/detail.php?id=77, 1 page.

DeGroot, "Onmouseover div swap gives flickering effect," webmaster-talk, Jan. 18, 2008, 3 pages.

JavaScript Kit, "Conditional Compilation of Jscript/ JavaScript in IE," 1997-2008, 2 pages.

Vasilik, "Advanced Experiment Techniques", Google Website Optimizer WOAC Summit '08, Nov. 11, 2008, 10 pages.

Freire et al, "WebViews: Accessing Personalized Web Content and Services." WWW10. ACM, 2001, pp. 576-586.

Han et al., "WebSplitter: A Unified XML Framework for Multi-Device Collaborative Web Browsing." CSCW'00. ACM, 2000, pp. 221-230.

'WayBack Machine' [online]. "HTML Tutorial-Attributes," in: http://tizag.com/thmlT/htmlattributes.php, Dec. 22, 2007, [retrieved on Nov. 6, 2011]. Retrieved from the Internet: <URL: http://web.archive.org/web/20081007121302/http://tizag.com/thm1T/htmlattributes.php>. 4 pages.

'WayBack Machine' [online] "Writing HTML, 27b. JavaScript-Dynamic Content," in: http://www.mcli.dist.maricopa.edu/tut/tut27b.html, Dec. 22, 2007, [retrieved on Nov. 6, 2011]. Retrieved from the Internet: <URL: http://web.archive.org/web/20081013220058/http://www.mcli.dist.maricopa.edu/tut/tut27b.html>. 8 pages.

'StackOverflow' [online]. "JavaScript—controlling the insertion point for document.write," original post—Oct. 8, 2009, [retrieved on Nov. 6, 2011]. Retrieved from the Internet: <URL: http://stackoverflow.com/questions/1536970/javascript-controlling-the-insertion-point-for-document-write>. 3 pages.

* cited by examiner

National Bicycle
Council Email
Newsletter

Please Provide us with the following information and after confirmation, we'll start sending you our email newsletter Email*

First Name

Last Name

Zip Code

" * " indicates a mandatory field.

Interests (check all that apply):

☐ Safety/Community Awareness
☐ Healthy Lifestyle
☐ Leisure Rides
☐ Competition
☐ Mountain Biking
☐ Road Cycling Submit

FIG. 4A    400

Thank You for Registering!!

You will receive an email from us shortly.

FIG. 4B    402

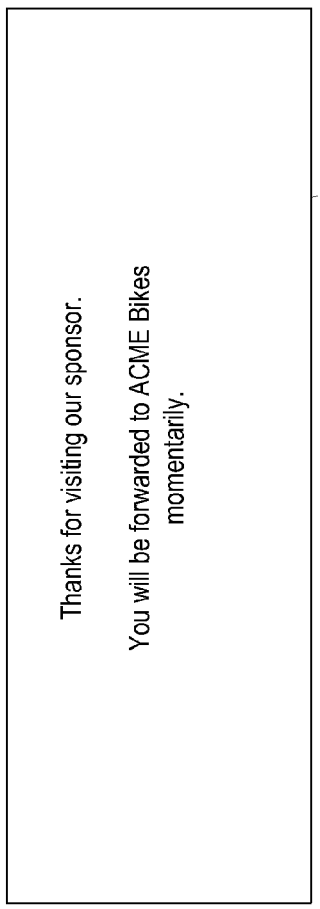

Thanks for visiting our sponsor.

You will be forwarded to ACME Bikes momentarily.

FIG. 5

Place the following Control Script between the "<head>" and "</head>" tags of the test page: www.nationalbicyclingcouncil.org/index.html <script><!-- Control Script ... //--></script>

Place the following Tracker Script between the <body> and </body> tags of the test page: www.nationalbicyclingcouncil.org/index.html and the conversion page: www.nationalbicyclingcouncil.org/acmebikesforward.html <script><!-- Tracker Script ... //--></script>

Designate variable sections in your test page: www.nationalbicyclingcouncil.org/index.html using the following format:

<script>utmx_section("NAME_OF_SECTION")</script>DEFAULT_VALUE</noscript>

Designate fragments of variable sections in your test page using the following format:
<script> utmx_section("NAME_OF_SECTION", FRAGMENT_NUMBER)</script>DEFAULT_VALUE </noscript>

FIG. 6

```
<head>
<script><!-- Control Script ... //--></script>   — 702
...
</head>
...
<body>                                                           — 705
<script> utmx_section("Style Graphics", 0)</script><img src=Style_A_TOP.gif>
</noscript>
<H1>                                                             — 706
<script>utmx_section("Header")</script>Come Ride With Us!</noscript>
</H1>
...                                                              — 708
<script>umtx_section("Image")</script><img src=racer.jpg></noscript>
                                                                 — 710
<script>umtx_section("Text")</script>The National Bicycle Council is dedicated to promoting health,
knowledge, and safety to the benefit of bicycle enthusiasts nationwide.</noscript>
                                                                 — 711
<script> utmx_section("Style Graphics", 1)</script><img src=Style_A_SIDE.gif>
</noscript>

...                                                              — 704
<script><!== Tracker Script ... //--></script>
</body>
```

```
...
<body>
...
<H1>Thanks for visiting our sponsor.<BR>
You will be forwarded to ACME <BR> Bikes momentarily
</H1>

...                                                    — 802
<script><!== Tracker Script ... //--></script>
</body>
```

Schema Selection

Please select the sections that are to be varied for this experiment:

| Name | Include |
|---|---|
| Header | ☒ |
| Image | ☐ |
| Text | ☒ |
| Style Graphics<br>- fragment(0)<br>- fragment(1) | ☒ |

| Experiment_ID | Section Names | |
|---|---|---|
| 123456 | Header, Text, Style Graphics | ... |
| 987654 | Image, Text, Style Graphics | ... |

FIG. 11A

| Experiment_ID | Section Name | |
|---|---|---|
| 123456 | Header | ... |
| 123456 | Text | ... |
| 123456 | Style Graphics | ... |
| 987654 | Image | ... |
| 987654 | Text | ... |
| 987654 | Style Graphics | ... |

FIG. 11B

| Experiment_ID | Page_ID | |
|---|---|---|
| 123456 | 7777 | ... |
| 987654 | 7777 | ... |

FIG. 11C

WEB PAGE EXPERIMENTS WITH FRAGMENTED SECTION VARIATIONS

CROSS-REFERENCE TO RELATED APPLICATIONS

This application is a continuation application of and claims priority to U.S. application Ser. No. 12/036,594, filed on Feb. 25, 2008, now U.S. Pat. No. 7,895,293, and is related to U.S. patent application Ser. No. 11/874,852, filed on Oct. 18, 2007, and U.S. patent application Ser. No. 11/874,843, filed on Oct. 18, 2007, now U.S. Pat. No. 7,809,725. The contents of each of the applications are hereby incorporated by reference.

BACKGROUND

Web pages available on modern websites, such as websites available on the Internet, are powerful communication tools for disseminating information regarding current events, organizations, and other items of interest to website visitors. Web pages can also provide targeted advertising of products and services. The content of web pages used to convey this information and deliver these advertisements varies considerably. Selections regarding style, graphics, and layout impact visitors' responses to the information offered on the web page, and seemingly small changes in web page appearance can sometimes dramatically change the effect of the web page on visitors.

SUMMARY

In one general aspect, a page identifier of a test page having code defining a content section, the content section comprising a plurality of content section fragments, is received. A content item group is selected from a collection of content item groups, each content item group defining an association of content items with content section fragments of the content section. Each identified content item in the selected content item group is transmitted for placement on the test page in the associated content section fragment.

Implementations may include the following features. The content item group may be selected pseudo-randomly from the collection of content item groups. The performance of the selected content item group in the test web page may be measured. The performance may be measured by recording that the user of the test page reached a conversion page for the selected content item group if the user of the test page with the selected content item group reaches the conversion page. An associated number of times conversion pages were reached for each content item group may be determined.

In one general aspect, a test web page is received. An experiment identifier is extracted from the test web page. A content section content section in the test web page is identified, wherein the content section comprises a plurality of content section fragments. A section identifier for the content section is extracted. A fragment identifier for each of the plurality of content section fragments is extracted. The section and fragment identifiers are stored in association with the experiment identifier. A user interface is presented requesting a group of content items for the content section corresponding to the extracted section identifier. A first group of content items for the content section corresponding to the extracted section identifier is received, the first group of content items defining an association of content items with the content section fragments of the content section. The first group of content items are stored in a record in association with the section identifier and fragment identifiers.

Implementations may include the following features. A second group of content items for the content section corresponding to the extracted section identifier may be received, the second group of content items defining an association of content items with the content section fragments of the content section. The second group of content items may be stored in a record in association with the section identifier and fragment identifiers. One of the first and second content item groups may be selectively delivered to a web browser accessing the test web page.

User responses to the test web page may be recorded. The performance of the test web page with respect to the first or second content item groups may be measured. An identifier of a conversion page may be received, and if the web browser accessing the test page accesses the conversion page, that the web browser accessed the conversion page for the delivered content item group may be recorded. The number of times web browsers accessed the conversion page when presented with the first content item group may be recorded and the number of times web browsers accessed the conversion page when presented with the second content item group may be presented.

BRIEF DESCRIPTION OF THE DRAWINGS

FIG. 4A illustrates an example data entry form web page as rendered by a web browser.

FIG. 4B illustrates an example confirmation web page.

FIG. 5 illustrates an example sponsor forward web page.

FIG. 6 is an example message including instructions for placing variable content sections in a test page.

FIG. 7 is an example of HTML source of a test web page having installed scripts.

FIG. 8 is an example of HTML source of a conversion web page.

FIG. 10 is an example user interface page for presenting extracted variable content section identifiers.

FIG. 11A shows an example records for storing variable content section identifiers selected for an experiment.

FIG. 11B shows a set of example records for storing variable content section identifiers.

FIG. 11C shows a set of example records that associate a page identifier with multiple experiment identifiers.

Like reference numbers and designations in the various drawings indicate like elements.

DETAILED DESCRIPTION

Figure 1:
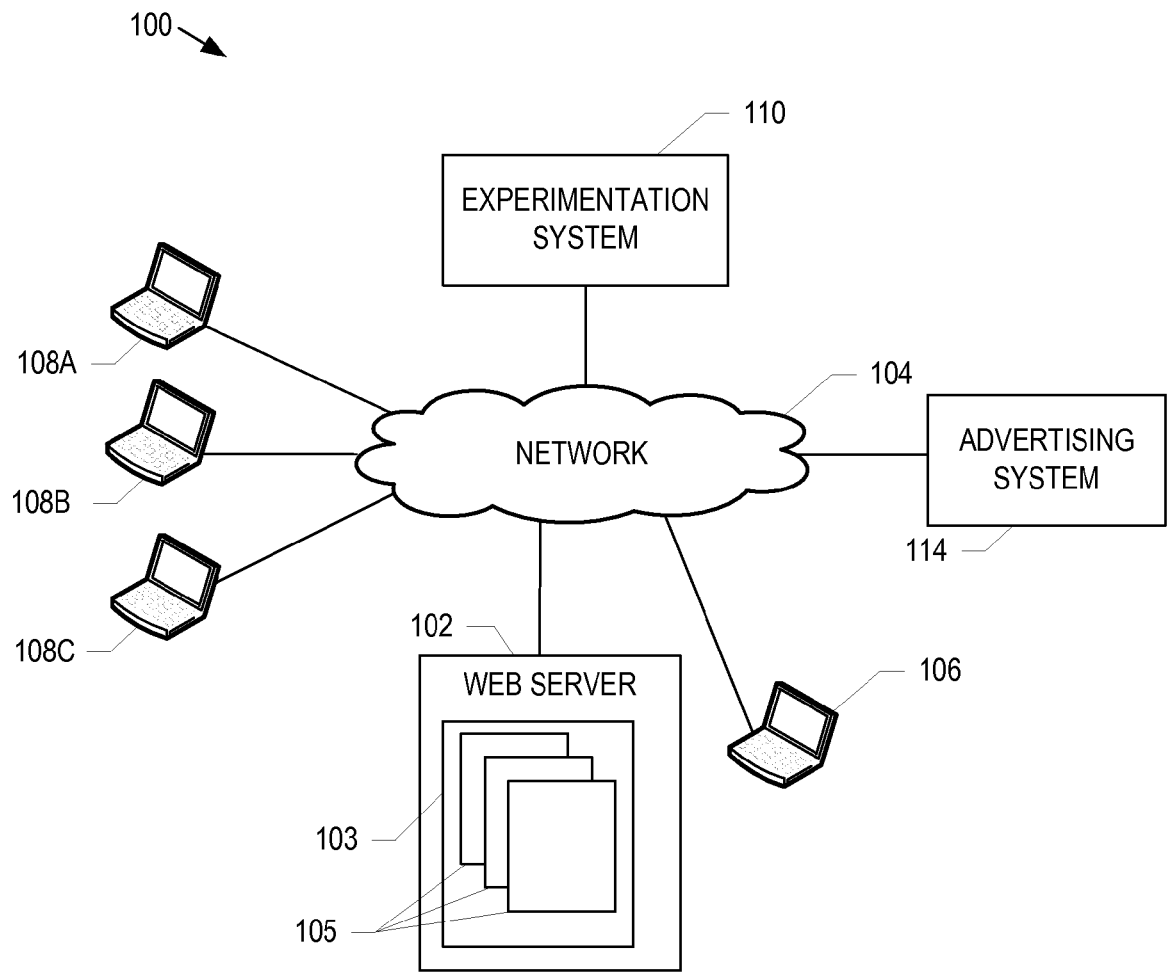
FIG. 1 is a block diagram of an example environment of an automated web page experimentation system.

FIG. 1 is a block diagram of an example environment 100 of an automated web page experimentation system 110. A web server 102 is connected to a network 104 such as the Internet. A website operator, designer, and/or a publisher (an employee of a business entity, for example, referred to collectively below as operators) using computer 106 can create, maintain, and otherwise administrate a website 103 having one or more web pages 105 stored on the web server 102. The web server can serve web page content 105 of the website 103 to visitors such as users of user computers 108A-C through web browser software installed on the user computers 108A-C.

The web pages 105 include hypertext markup language (HTML) code that is interpreted by the web browsers to render the pages for display to a visitor, for example, on a display of the computer 108A. The web pages 105 can also include scripts. A script, in this context, refers to code embedded in a web page. A script can be written in, for example, Javascript.

Content of the web pages 105 of the website 103 can be directed toward one or more goals such as, for example, collecting names of visitors/customers, selling a product or service, directing traffic to more pages 105 of the website 103, and/or directing traffic to the website of a sponsor. Website operators or others responsible for website content generally select website content to achieve these goals. To optimize the content of one or more web pages 105 to reach a given goal, experimentation system 110 can be used to conduct tests that present one or more web page variations to visitors and record the effectiveness of each variation in achieving the goal.

A test that presents multiple variations in web page and/or website content is referred to herein as a multivariate test. A webpage operator (or experimentation system user) can access the experimentation system 110 to create experiments, manage experiments, and view reports regarding the effectiveness of variations in content of one or more web pages of the website 103.

In some implementations, a website operator utilizes an advertising system 114 to direct visitor traffic to the website 103. For example, a website operator can arrange to have advertisements, including hypertext links directing users to the website 103, placed on other Internet web pages. The pages selected for placement of the advertisements can, for example, be search engine results pages generated after a search engine user enters a search string including one or more words selected by a website operator as relevant to the content of the website 103. If the website 103 includes information regarding bicycling, for example, a website operator might arrange for advertisements to be placed on results pages for search queries including the word "cycling".

In addition, advertisements can be placed by the advertising system on web pages operated by others who agree to partner with the advertising system in delivering advertisements. The advertising system can then place advertisements for the website 103 on pages determined to have content that is contextually significant to the website 103. For example, an advertisement for the website 103 might appear on another bicycling related website. A website operator can agree to pay an owner of the advertising system a fee for each advertisement shown, and/or a fee for each time the advertisement successfully directs a visitor to the website 103.

The experimentation system can maintain records for a number of website operators. A website operator (or a team of website operators) can be assigned a user account on the experimentation system. By logging into the experimentation system a website operator can view experiments that are associated with the user account. For example, the website operator can create new experiments, start and stop experiments, and view experiment progress. The experimentation system can generate an experiment identifier for a newly created experiment. An experiment identifier can be associated with a user account, by for example storing the experiment identifier in a field of a database record that includes a user account identifier in another field.

In an implementation, a page identifier can be assigned to a test page, and multiple experiments can be associated with the page identifier. For example, the page identifier can be stored in a field of a database record that includes an experiment identifier in another field. The page identifier can be a test page URL or a page identifier assigned by the experimentation system 110. Multiple experiment identifiers can be associated with a page identifier corresponding to the test page. Multiple experiments associated with the same test page identifier can be conducted simultaneously and/or consecutively.

Scripts installed on a test page adapt the page for use with the experimentation system 110. The process of installing scripts on a test page is referred to as instrumentation or instrumenting a test page. Instrumentation of the test page generally includes a website operator modifying the code of a test page to insert one or more scripts. For example, the website operator can open the test page in a text editor or an HTML editor and modify the HTML code of the test page, or an old test page file can be deleted and replaced with a new file. Alternatively, default scripts may installed automatically for the website operator.

Figure 2:
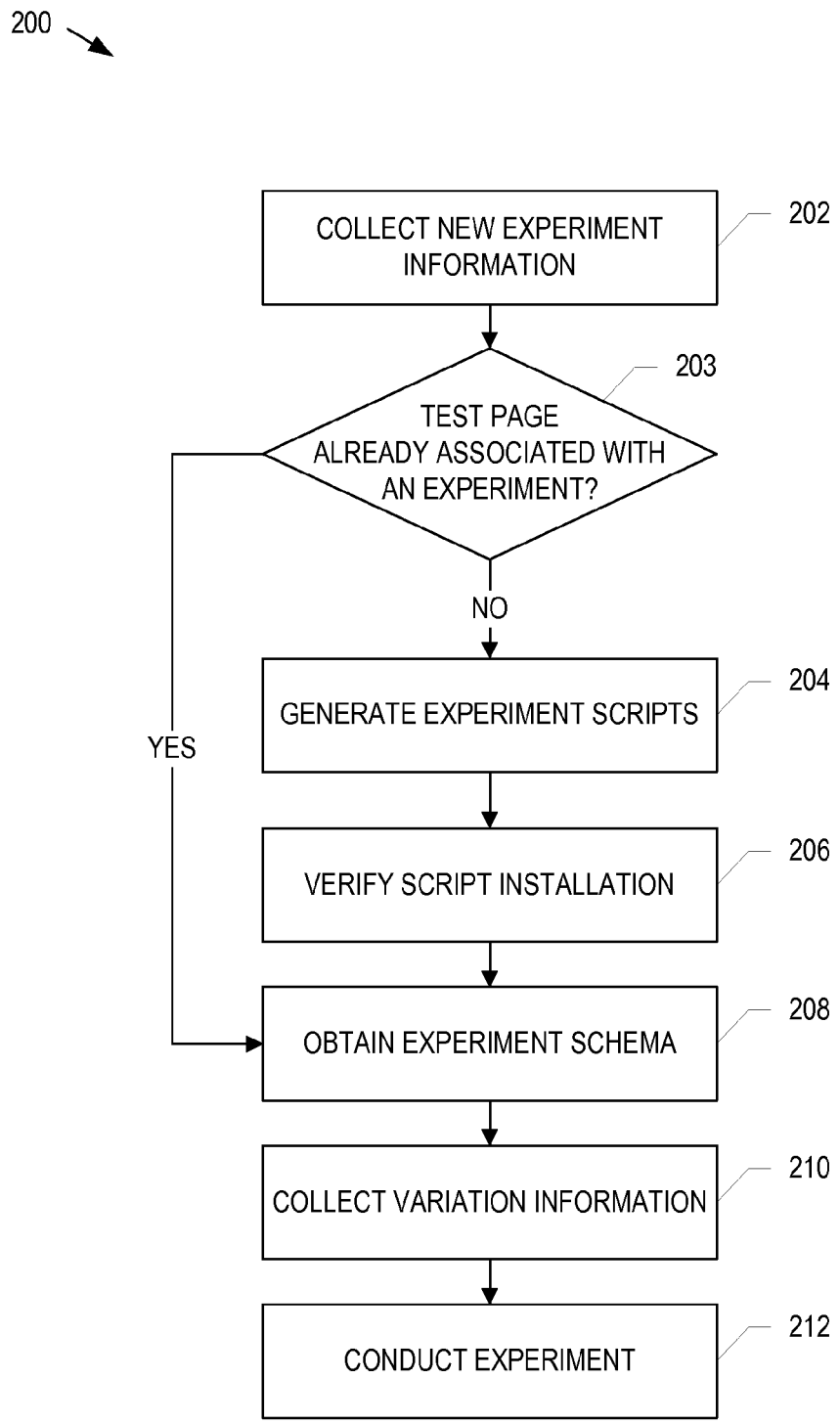
FIG. 2 is a flowchart of an example method of performing a web page experiment using an experimentation system.

FIG. 2 is a flowchart 200 of an example method of performing a web page experiment using an experimentation system 110. A website operator accesses a user interface (for example, a web based interface) of the experimentation system 110 using a computer with web browser software functioning as a user interface device. Experiment information is collected (202). For example, the experimentation system 110 can prompt the website operator to enter a name of a new experiment, a URL of a test page for the experiment, and a URL of a conversion page for the experiment. The test page is the page on which the experimentation system will conduct a multivariate test. The conversion page is a page designated by a website operator as a goal. A conversion occurs, and a given test page combination can be credited with the conversion, if a visitor reaches the conversion page after viewing the test page combination. The experiment information can be stored in the experimentation system 110 in a way that identifies it the experiment identifier. For example the experiment information can be stored in a database record that includes the experiment identifier.

A check is made to determine if the test page identified by the user is already associated with an experiment (203). For example, the experiment system 110 can access the URL of the test page to determine if experimentation system scripts have already been installed, and/or the experimentation system 110 can search database records to determine if the URL of the test page is associated with an existing experiment. If the URL of the test page is associated with an existing experiment, the process can proceed to obtaining experiment schema for the new experiment (208).

If the test page is not already associated with an experiment, one or more scripts for use on the test and/or conversion pages of the experiment are generated (204). For example, the experimentation system 110 can provide the scripts to a website operator through the user interface or in an email, for example. The scripts may be installed automatically, or instructions for installing the scripts on the test and conversion pages may be provided.

The scripts generated by the experimentation system can be installed by inserting the scripts into the hypertext markup language of the test and/or conversion pages. The experimentation system can provide instructions for placing variable content sections in the test page. A single variable content section may be a contiguous section of the test page, or may be divided into two or more fragments and placed throughout the test page. The website operator can indicate that the scripts have been installed using, for example, the user interface of the experimentation system 110. The method includes verifying that the scripts have been installed (206).

An experiment schema is identified (208). An experiment schema includes the name (or other identifier) and number of variable content sections and any fragment sections thereof that are to be varied during the experiment. An experiment schema can be entered manually by a website operator into the experimentation system 110. For example, the website operator can enter the name of one or more variable content sections and variable content section fragments that are found on the test page. The name entered by the website operator can correspond to a respective variable content section script or variable content section fragment script included in the test page.

In some implementations, potential experiment schema is captured by the experimentation system 110 by parsing the code of the test page. If variable content sections are found, the experimentation system captures information from these sections to use in defining a schema for the experiment. Any variable content sections and associated fragments found on the test page can be presented to a website operator through the user interface. The website operator can then select the variable content sections that are to be included in the experiment. When a variable content section that includes fragments is selected to be included in the experiment, each of the fragments included in the variable content section are also included in the experiment.

The obtained schema is then used to prompt for and collect variation information for the experiment from the website operator (210). The variation information will be inserted into corresponding variable content sections including associated fragments by the experimentation system as explained below. The variation information is stored for use by the experimentation system. The experiment is then conducted (212). During the experiment, varying combinations of the test page are displayed to visitors, and the respective number of conversions for the combinations displayed are recorded by the experimentation system 110.

Figure 3:
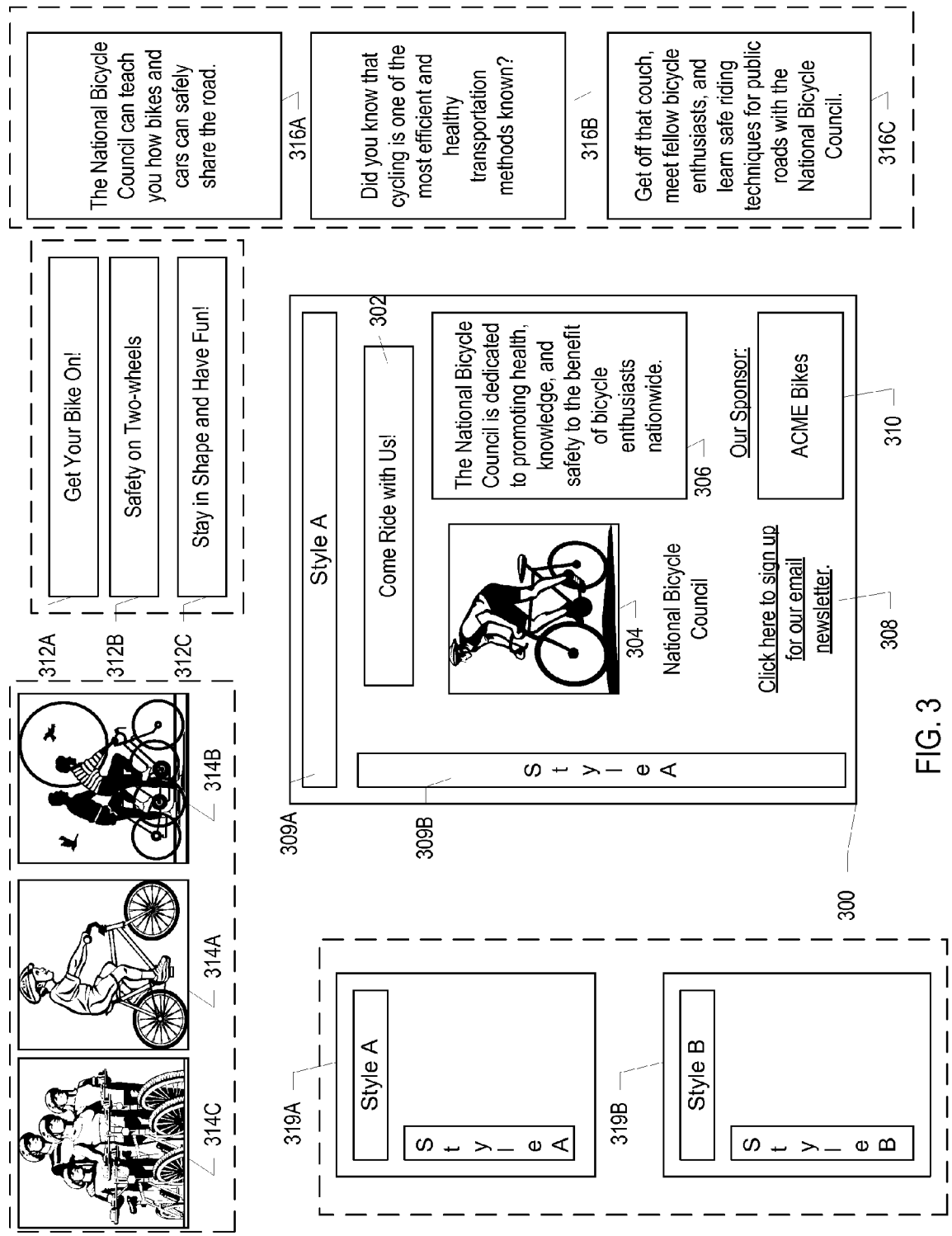
FIG. 3 is a diagram of an example test page and variable content items.

FIG. 3 is a diagram of an example test page 300 and variable content items. In some implementations, an advertisement of the advertising system 114 links to the test page 300. Test page 300 includes a heading 302, an image 304, text block 306, form link 308, sponsor link 310, and style graphics 309A and 309B. Variable content items include heading variations 312A, 312B, and 312C, image variations 314A, 314B, and 314C, and text variations 316A, 316B, and 316C. Variable content item groups include style graphics variations 319A and 319B. The web page 300 has default content for the heading 302, image 304, style graphics 309A-B, and text block 306. The URL (for example "www.example.com") of the test page 300 may be provided to the experimentation system 110 through the user interface.

Style graphics 309A and 309B are examples of variable content item groups used to vary the content of variable content sections that include fragments. A variable content section of a test page may include two or more variable content section fragments. Variable content sections are replaced with variable content items independently of each other. For example, the heading variation content items 312A-C selected to replace the heading variable content section 302 in the test page is independent of the text variation content items 316A-C selected to replace the text block variable content section 306 in the test page during an instance of an experiment. In contrast, variable content section fragments that are part of the same variable content section are related by content and replaced by variable content items from the same variable content item group during an instance of an experiment. For example, style graphics 309A and 309B are graphics designed to give the test page a particular look or feel. During an experiment, a website operator may wish to replace both the style graphics 309A and 309B with graphics from either variable content item group 319A or variable content item group 319B. If the web designer had implemented style graphics 309A and 309B as independent variable content sections, rather than as fragments of single variable content section, then there would be test pages generated that contain a style graphic 309A selected from the group 319A and a style graphic 309B selected from the group 319B. Using fragments ensures that the style graphics 309A and 309B are selected from the same variable content item group.

Through experimentation, the effectiveness of the default content and combinations of the variable content items in achieving a goal can be measured. To measure the effectiveness, a goal is selected as the conversion page. The selected goal can be, for example, user visits to the newsletter signup page linked to by the link 308, actual data entered and submitted to that page, or user visits to the site sponsor linked to by link 310.

If the selected goal is a user visit to the newsletter sign up page, the conversion page can be a page having a newsletter signup form such as shown in FIG. 4A. FIG. 4A illustrates an example data entry form web page 400. If the selected goal is instead an actual submission of the newsletter signup form, the conversion page can be a confirmation page such as the page 402 shown in FIG. 4B. FIG. 4B illustrates an example confirmation web page 402.

If the selected goal is a user visit to a website sponsor, the confirmation page can be a page linked to by the sponsor link 310. FIG. 5 illustrates an example sponsor forward web page 500. The sponsor link 310 links to the forward page 500 which, after a short delay, redirects the user's web browser to the sponsor website. The URL of the conversion page selected by the website operator as the goal (for example "www.example.com/acmebikesforward.html") is provided to the experimentation system 110 through the user interface.

As an illustrative example, the code of the test page 300 can be instrumented with four variable content scripts corresponding to the four variable content sections. The variable content sections can include the header 302, the image 304, style graphics 309A-B, and the text 306.

A given experiment conducted on the test page 300, however, need not vary the content of all four sections. For example, a first experiment can be conducted that varies the content of the header 302, a second experiment can be conducted that varies the image 304, a third experiment can be conducted that varies the text 306, and a fourth experiment can be conducted that varies the style graphics 309A-B. For further example, a first experiment can be conducted that varies the header 302 and the image 304, and a second experiment can be conducted that varies the image 304 and the style graphics 309A-B. These experiments can be run consecutively, or simultaneously. The experimentation system can switch from performing one experiment to the other without the need for the code of the test page 300 to be changed.

Two or more experiments can be run during a period of time in which the test page code remains unchanged. That is, the variable content sections and associated fragments of the test page code used to instrument the experiment remain static. For example, a first experiment can be run for a first experiment period and visitor responses to content combinations delivered to the visitors can be recorded during the experiment period. A second experiment can be run for a second experiment period and visitor responses to content combinations delivered to the visitors can be recorded during the second experiment period. The first experiment period and the second experiment period can overlap such that two experiment are being run on the same test page at the same time. The experimentation system can spread visitor traffic to the test page across multiple running experiments based on, for example, whether a given visitor has a cookie on their browser indicating that content of one of the running experiments has previously been served to that browser, and/or a traffic balancing goal across the experiments.

FIG. 6 is an example message 600 including instructions for placing variable content sections and associated fragments in a test page. The example message 600 includes a control script and a tracker script. Scripts can include, for example, a page identifier that uniquely identifies the page in the experimentation system 110. The control script can include code that when interpreted by a web browser causes the web browser to contact the experimentation system 110 to retrieve content for display by the browser in the variable content sections of the web page 300. The tracker script can include, for example, code for storing a cookie in memory of a computer on which a web browser is running (computer 108A, for example). The cookie can be used, for example, to determine whether a user has visited the test page within a certain period of time prior to visiting the conversion page as well as determining which combination of variable content was displayed to the user on the test page. For example, the cookie can include the experiment identifier of a test page accessed by the user, the time the test page was accessed, and/or indicators that denote which variable content was displayed to the user in respective variable content sections.

In an implementation, the contents of a cookie delivered to a browser by the experimentation system 110 through the tracker script includes an experiment identifier. The cookie can also include the page identifier. The cookie can be used to determine which of a number of multiple experiments associated with the page identifier have been delivered to a given browser.

The example message 600 includes a script format for variable content sections to be placed on the test page. The format shown in the example variable content items: "<script>utmx_section("NAME_OF_SECTION")</script>DEFAULT_VALUE</noscript>" where NAME_OF_SECTION is a name given to the variable content section by the website operator that can serve as a variable content section identifier. DEFAULT_VALUE is the default page content for the given variable content section.

The example message 600 further includes a script format for variable content sections that include fragments to be placed on the test page. The format shown in the example is: "<script>utmx_section("NAME_OF_SECTION", FRAGMENT_NUMBER)</script>DEFAULT_VALUE_FOR_FRAGMENT</noscript>" where NAME_OF_SECTION is a name given to the variable content section by the website operator that can serve as a variable content section identifier. FRAGMENT_NUMBER is the number assigned to the fragment within the variable content section. In an implementation, the first fragment in variable content section is called fragment 0, with each subsequent fragment being incremented by 1. The fragment number along with the section name can serve as a variable content section fragment identifier. DEFAULT_VALUE_FOR_FRAGMENT is the default page content for the fragment associated with the fragment number for the particular variable content section.

FIG. 7 is an example of HTML source 700 of a test web page having installed scripts. The HTML source includes a control script 702 and a tracker script 704. The HTML source also includes three variable content script sections 706, 708, and 710, as well as two variable content fragment script sections 705, and 711. The three variable content script sections and two variable content fragment script sections correspond to the variable content sections and fragment sections of the example test page 300. The variable content script section 706 corresponds to the variable content section 302 of the test page 300. This section has been given the name "Header" by the website operator, and default content of "Come Ride With Us!". The variable content script section 708 corresponds to the variable content section 304 of the test page 300. This section has been given the name "Image" by the website operator, and default content of "<img src=racer.jpg>". The file "racer.jpg" is the image file of the image shown in section 304 of the test page 300. The variable content script section 710 corresponds to the variable content section 306 of the test page 300. This section has been given the name "Text" by the website operator, and default content matching the text shown in section 306 of the test page 300.

The variable content fragment section 705 corresponds to section 309A of the test page. This fragment is the first fragment (i.e., fragment 0) of the variable content section that includes sections 309A-B, and has been given the name "Style Graphics" by the web site operator. The default content for this fragment is <img src=Style_A_TOP.gif>, corresponding to the top image in the variable content item group 319A. The file "Style_A_TOP.gif" is the image file of the image shown at section 309A of the test page 300.

The variable content fragment section 711 corresponds to section 309B of the test page. This fragment is the second fragment (i.e., fragment 1) of the variable content section named "Style Graphics" described above. The default content for this fragment is <img src=Style_A_SIDE.gif>, corresponding to the side image in the variable content item group 319A. The file "Style_A_SIDE.gif" is the image file of the image shown at section 309B of the test page 300.

FIG. 8 is an example of HTML source 800 of a conversion web page. The HTML source 800 corresponds to the example page 500 of FIG. 5 and includes a tracker script 802 that has been installed by the website operator.

Once the scripts have been installed on the test page and conversion page, the website operator can to initiate a script verification process. The operator can do this, for example, using the user interface of the experimentation system 110. The verification process can optionally check the HTML source of the web pages at the URL locations indicated for the experiment to determine if the scripts are installed correctly.

The website operator can manually enter the schema for the experiment into the user interface of the experiment system. The manually entered schema can include the names (or other identifiers) of variable content sections and fragments that have corresponding variable content scripts in the source of the test page that are to be used in the experiment. The entered schema can include all of the instrumented variable content sections and fragments or some subset of those variable content sections and fragments.

Figure 9:
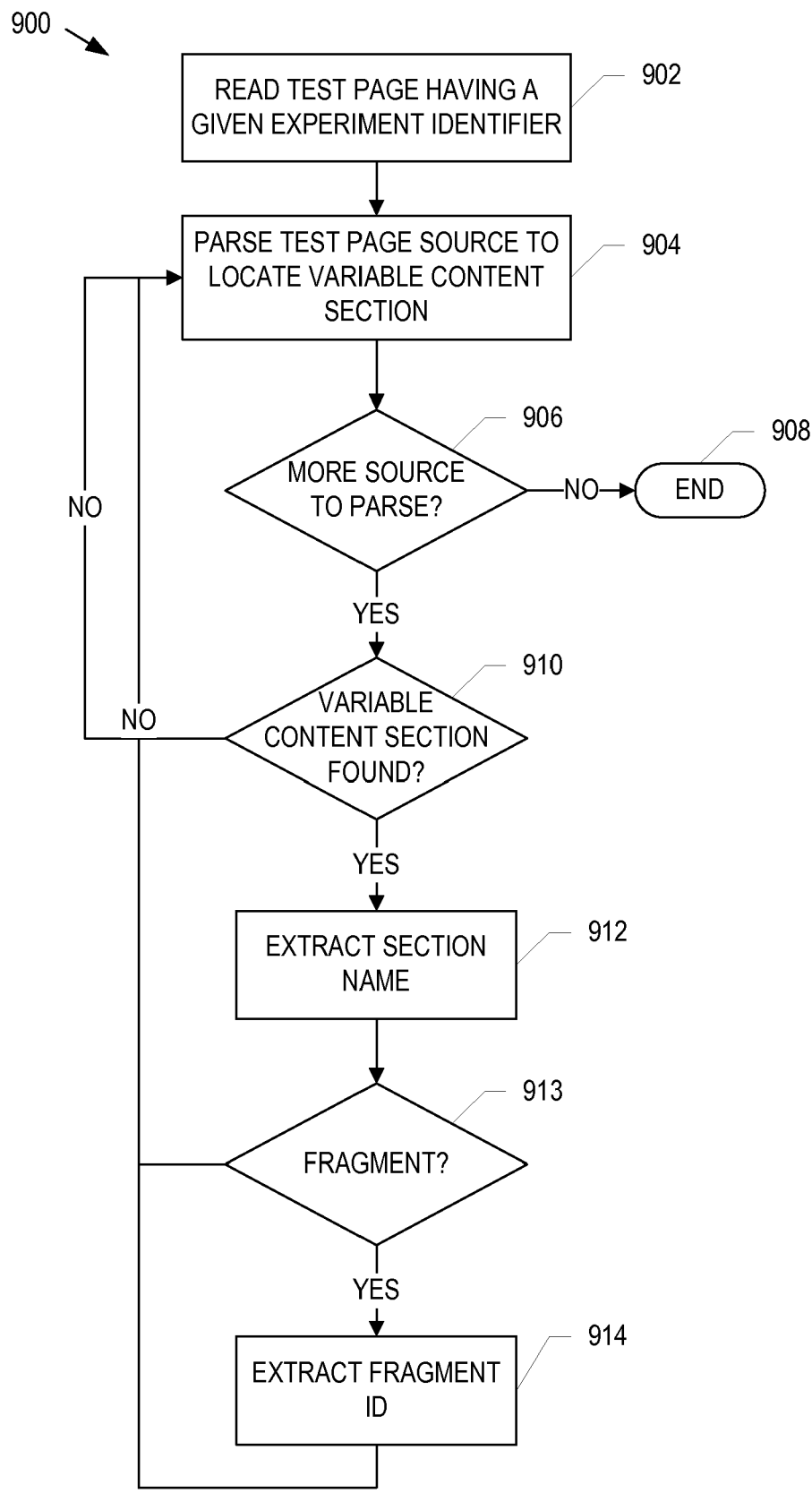
FIG. 9 is a flowchart of an example process for scanning a test web page to extract a potential experiment schema.

In some implementations, the experimentation system 110 reads the HTML source of the test page to scan for variable content scripts. FIG. 9 is a flowchart of an example process 900 for scanning a test web page to extract a potential experiment schema. The test page is read, e.g., by the experimentation system 110 (902). The test page can have a corresponding page identifier included in its code. The experiment identifier can be located, for example, in one or more of the scripts installed on the test page. The HTML source of the test page is parsed to locate a variable content section (904). If there is no more source to parse (906) the process ends (908). The process loops to continue parsing the test page if a variable content section is not encountered (910). If a variable content section is found (910) the name of the variable content section is extracted (912). Further, if the variable content section includes a fragment (913) the fragment identifier is also extracted (914). For example, if the process 900 reads the example test page source code 700, the process extracts section names "Header", "Image", "Text", and "Style Graphics". The process further extracts the fragment identifiers 0 and 1 from the variable content section fragments associated with the variable content section "Style Graphics". The names of the extracted sections and associated fragment identifiers can be presented to the website operator as selectable options for inclusion in the experiment.

FIG. 10 is an example user interface 1000 page for presenting extracted variable content section identifiers and fragment identifiers. The extracted names and fragment identifiers are presented along with a check box for the user to indicate which variable content sections are to be included in the experiment. Because fragments within the same variable content section are presented and updated from the same group of variable content items at a time, a user selects the variable content section containing the fragments for inclusion in the experiment, rather than the individual fragments. After selections are made they can be submitted to the experimentation system 110 by selecting the "continue" button. Selected variable content section identifiers can be associated with the experiment identifier of the experiment in the experimentation system 110.

FIG. 11A shows example records for storing variable content section identifiers selected for an experiment. The records include an experiment identifier field as well as a section names field. The section names field includes the captured experiment schema in a comma separated list. The record can include additional fields. The record 1100 shows sections names that correspond to those shown as selected in FIG. 10 stored with an experiment identifier "123456". The record 1102 shows section names selected for another experiment that has an experiment identifier of "987564". The section names of record 1102 can be selected during the creation of another experiment to be run on the same test page as the experiment having the identifier "123456". For example, the process of FIG. 2 can be repeated. However, in this case, the test page is already associated with an experiment (203) so that the process can proceed to obtaining experiment schema (208). The second experiment can therefore be initiated without the need for changes to be made to the code of the test page.

FIG. 11B shows a set of example records 1104 for storing variable content section identifiers. This format is an alternative to that shown in FIG. 11A. The selected variable content section identifiers are stored in a plurality of records, each variable content section identifier being stored in a separate record.

FIG. 11C shows a set of example records that associate a page identifier with multiple experiment identifiers. The experiments "123456" and "987654" are associated with the test page having the identifier "7777".

Figure 12:
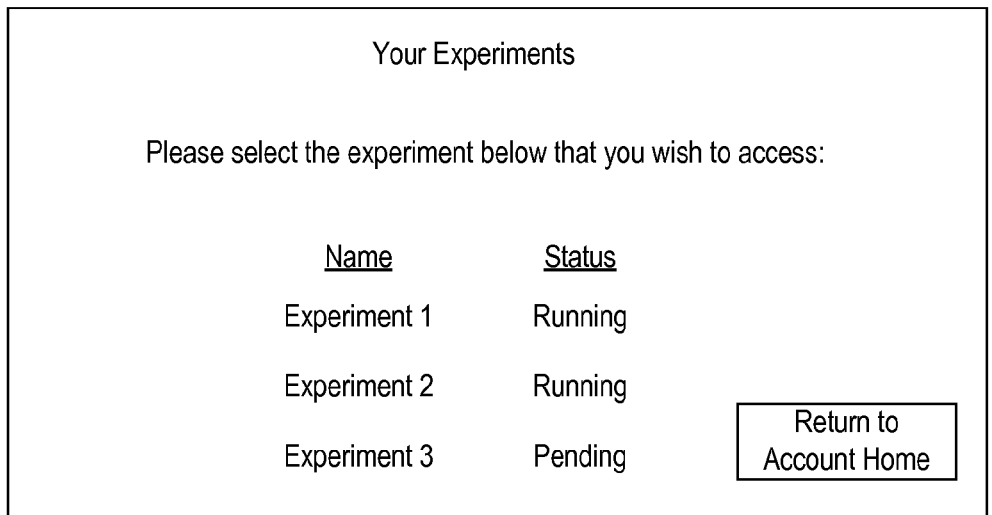
FIG. 12 is an example user interface page of an experimentation system.

FIG. 12 is an example user interface page 1200 of an experimentation system 110. The page 1200 can be displayed to a website operator upon logging into the experimentation system 110. The page 1200 shows a set of example experiments and their corresponding status. The page 1200 can be displayed, for example, in a web browser of the computer 108A. By selecting an experiment, through clicking on the experiment name, for example, a website operator can access the experiment to enter experiment information, start and stop the experiment, and/or see its progress.

Figure 13:
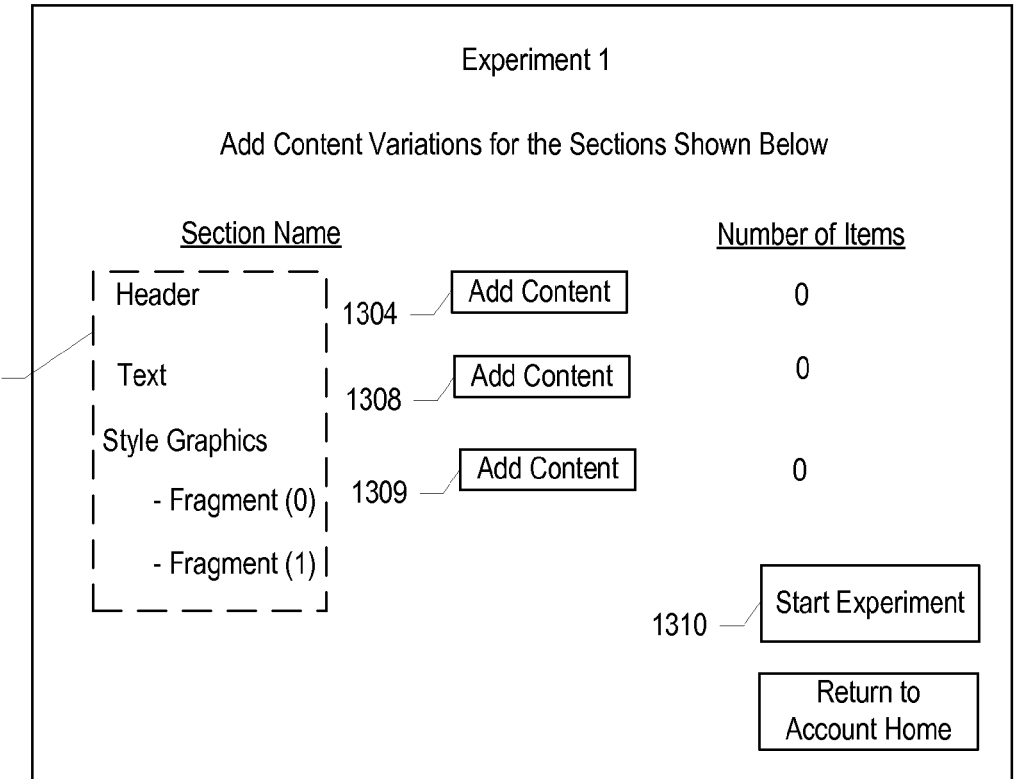
FIG. 13 is an example user interface experiment administration page.

FIG. 13 is an example user interface experiment administration page 1300. The page 1300 can be displayed, for example, in response to a user selecting an experiment of the web page 1200. The web page 1200 can include a link that references an experiment identifier. For "Experiment 1" which has a status of "pending", the link can refer to an experiment for which the experimentation system 110 has previously obtained an experiment schema. For example, the experiment identifier can refer to an experiment for which the experimentation system 110 has previously received variable content selections from a website operator. The experiment administration page 1300 shows the variable content section identifiers 1302 that are associated with the selected experiment. For instance, "Experiment 1" can correspond to an experiment identifier "123456". The experimentation system can query a database table for records associated with the experimentation identifier "123456" to retrieve a previously stored variable content selections and display the names of variable content sections and associated fragments on the page 1300. The experimentation system can also query a database table to find any variable content items (or variable content item groups where the variable content sections include fragments) associated with the variable content sections, count those items, and display the resulting number of content items or content item groups next to the corresponding section name on the page 1300.

In response to a website operator clicking the "Add Content" button 1304, a dialog box for accepting variable content items for the variable content section named "Header" can appear. The website operator can, for example, enter the variations in header content 312A-C of FIG. 3. In response to a website operator clicking the "Add Content" button 1308, a dialog box for accepting variable content items for the variable content section named "Text" can appear. The website operator can, for example, enter the variations in text content 316A-C of FIG. 3 by typing in the variations, pasting text into the forms, and/or uploading text files. In response to a website operator clicking the "Add Content" button 1309, a dialog box for accepting variable content items for the variable content section named "Style Graphics" can appear. Because the variable content section named "Variable Graphics" contains two fragments, the dialog box may contain a section for entering content for each fragment. Further, the content may be entered by specifying groups of variable content items with a content item in the group corresponding to each of the fragments. For example, the website operator can enter the variations in content 319A-B by uploading two sets or groups of content items. The first content item group may correspond to the graphic files shown in the variable content item group 319A. The second content item group may correspond to the graphics files shown in the variable content item group 319B. The experiment can be started by selecting the "Start Experiment" button 1310.

Figure 14:
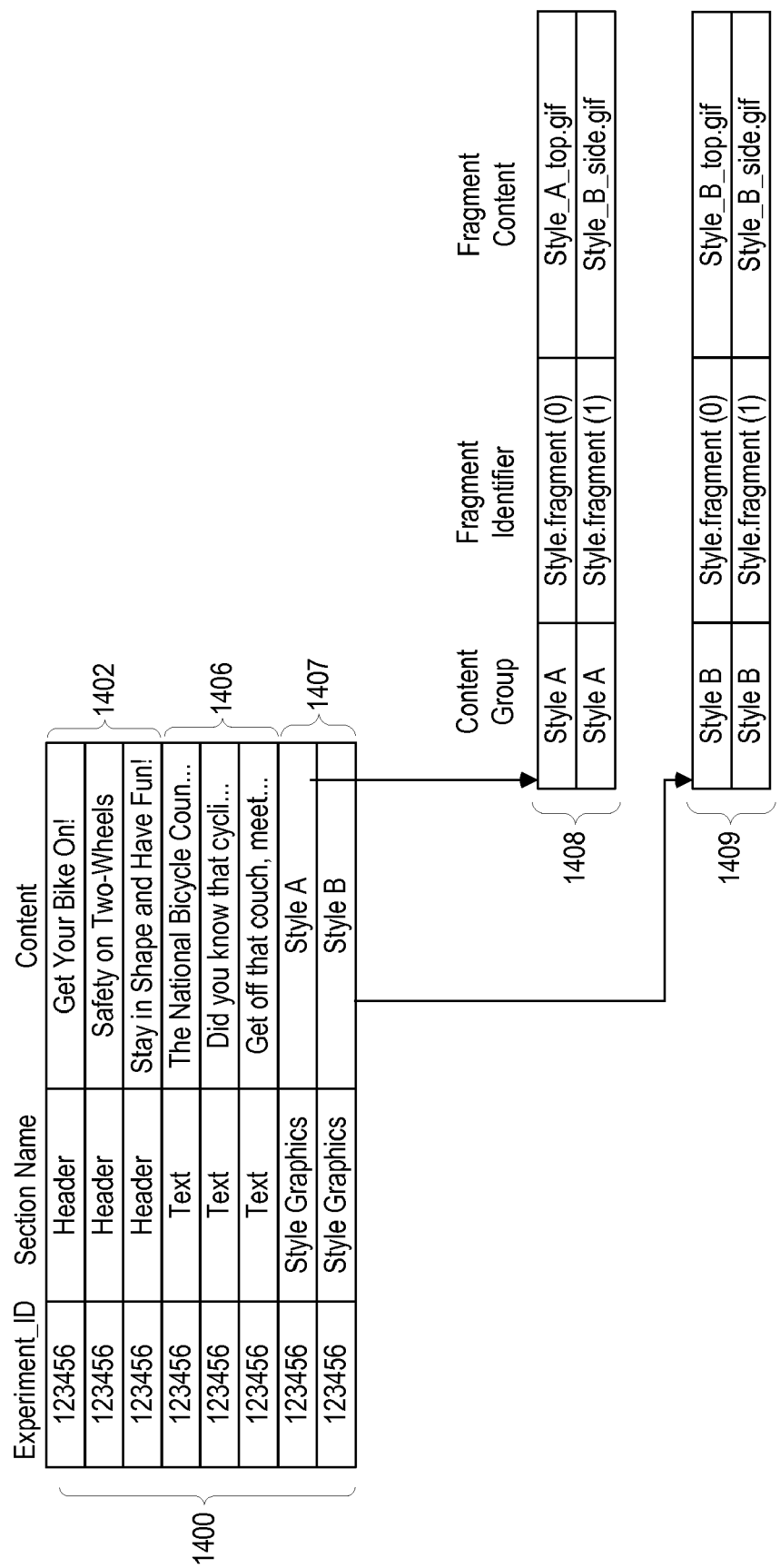
FIG. 14 illustrates an example set of records for storing variable content items and variable content item groups.

FIG. 14 illustrates an example set of records 1400 for storing variable content items and variable content item groups. The variable content items and variable content item groups input to the system by a website operator though the interface page 1300 can be stored in the example records 1400. The records 1400 illustrate an example manner for storing the variable content of the "Header", "Text", and "Style Graphics" sections FIG. 3. The "Header" section can correspond to the header section 302 of FIG. 3. The records 1402 can store the variable content items for the header section 302. The "Text" section can correspond to the text section 306 of FIG. 3. The records 1406 can store the variable content items for the text section 306. The "Style Graphics" section can correspond to the style graphics section 309A-B. The records 1407 can store references to the variable content item groups for the style graphics sections 309A-B.

Because the style graphics section 309A-B correspond to two variable content fragments of the variable content section "Style Graphics" (i.e., fragment 0 and fragment 1), the records 1407 contain pointers or references to content item groups that include a variable content item corresponding to each of the fragments. The first "Style Graphics" record contains a pointer to a records 1408 containing a content item entry for each fragment in variable content item "Style Graphics". The content item "Style_A_top.gif" is associated with style.fragment(0) and the content item "Style_A_side.gif" is associated with style.fragment(1). These graphic files correspond to the graphics shown in FIG. 3 in the variable content item group 319A.

The second "Style Graphics" record contains a pointer to a records 1409 containing a content item entry for each fragment in variable content item "Style Graphics". The content item "Style_B_top.gif" is associated with style.fragment(0) and the content item "Style_B_side.gif" is associated with style.fragment(1). These graphic files correspond to the graphics shown in FIG. 3 in the variable content item group 319B.

While the experiment is running, on the test page 300, for example, the experimentation system, through communication with the web browser of a visitor's computer running the scripts installed on the test page 300, varies the test page displayed to visitors by selectively replacing the content in the variable content sections with one instance of the corresponding variable content entered by the website operator into the experimentation system. Where the variable content section includes fragments, all of the fragments in the variable content section are replaced with variable content items from a selected one of the variable content item groups entered by the website operator. A number of resulting test page variations can be produced that include combinations of default variable section content and content stored in the experimentation system. The experimentation system balances the number of times that a given combination is displayed to visitors such that each of the combinations are displayed an approximately equal number of times. Traffic to the page 300 is tracked by the experimentation system which records the number of times a given combination of variable content achieves the designated goal for the experiment. A user interface of the experimentation system can provide the data recorded by the experimentation system so that the relative conversion rates of the test page combinations can be compared.

Figure 15:
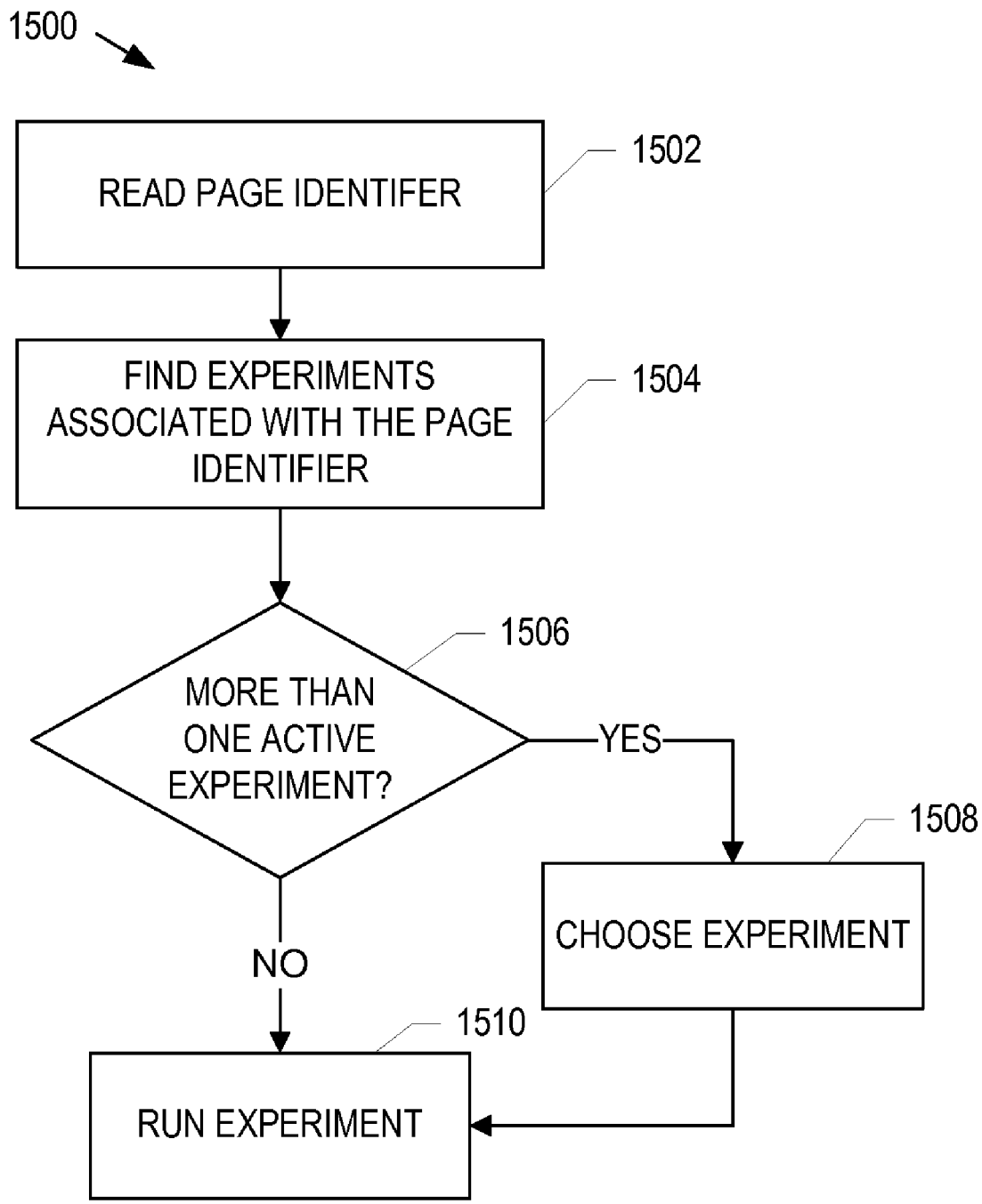
FIG. 15 is an example process performed by an experimentation system for running an experiment on a test page that can have more than one associated experiment.

FIG. 15 is an example process 1500 performed by, for example, an experimentation system for running an experiment on a test page that has more than one associated experiment. A website visitor can visit the test page, and the visitor's web browser can execute the scripts on the test page. The page identifier included in the scripts can be passed to the experimentation system 110. The page identifier is read (1502) (e.g., by the experimentation system 110). A searches is performed to find experiments that are associated with the page identifier (1504). If one active experiment is found, the that experiment is run (1510). If more than one active experiment is found, a choice is made as between the active experiments (1508) and the chosen experiment is run (1510). The active experiment can be chosen based on a comparison of the states of the experiments (for example to balance traffic across the experiments) and/or a state represented by a cookie of the visitor's web browser (for example to keep a given user associated with an experiment for which the user has previously received content).

Figure 16:
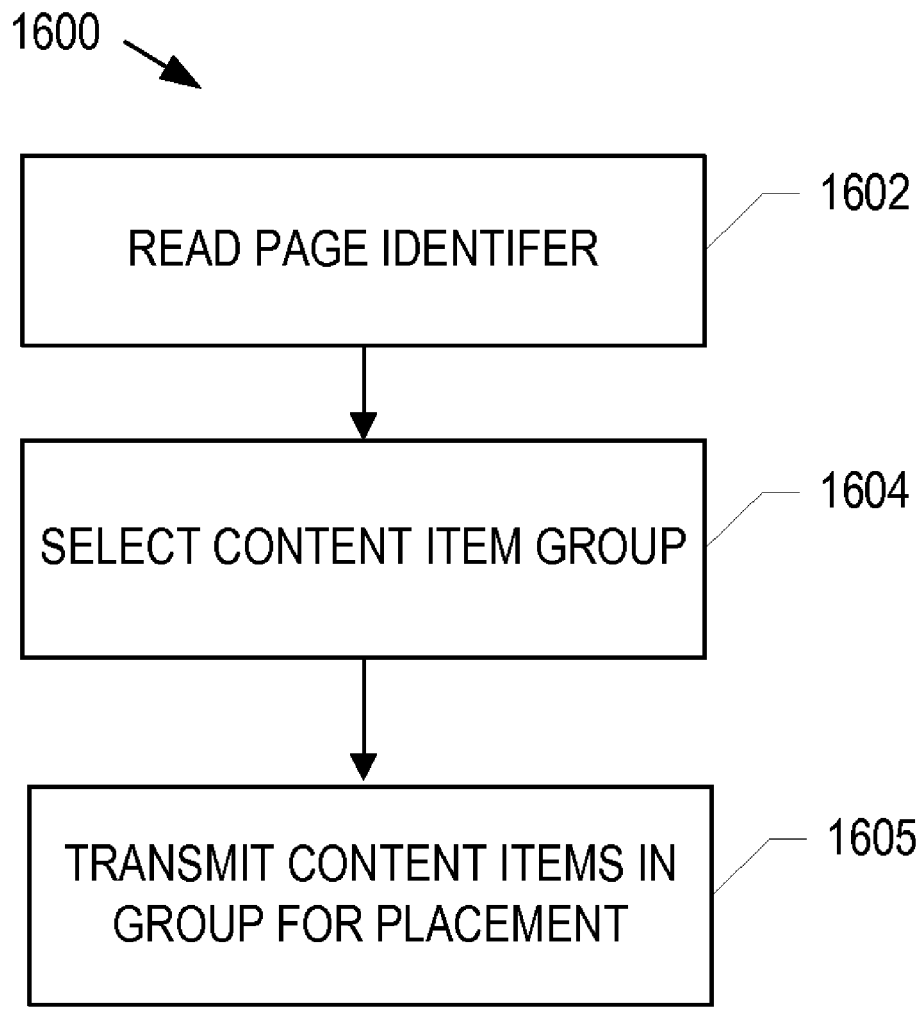
FIG. 16 is an example process performed by an experimentation system for running an experiment on a test page including variable section fragments.

FIG. 16 is an example process 1600 performed by, for example, an experimentation system for running an experiment on a test page including variable section fragments. A website visitor can visit the test page, and the visitor's web browser can execute the scripts on the test page. The test page may include one or more variable content sections, with one or more of the variable content sections including variable content section fragments The page identifier included in the scripts can be passed to the experimentation system 110. The page identifier is received (1602) (e.g., by the experimentation system 110). For each variable content section including variable content section fragments, a content item group is selected from a collection of content item groups (1604). Each content item group includes a content item associated with one of the variable content section fragments in the variable content section. The content item group may be selected randomly or pseudo-randomly, for example. Each of the content items in the selected content item group may then be transmitted for placement in their associated content section fragment in the variable content section (1605).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter affecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method for delivering content to a user device executing an application that displays the content in a display environment, comprising:
   receiving a identifier of a test display environment for an experiment, the test display environment including a content section, wherein the content section comprises a plurality of content section fragments, wherein the content section fragments for the content section are portions of the content section that have been identified as being replaceable by related content during the experiment;
   selecting, with one or more computers, content items for the content section fragments, the selecting comprising selecting a content item group for the content section from a plurality of content item groups for the content section, wherein each content item group specifies a content item for each fragment of the content section;
   transmitting, with the one or more computers, each content item in the selected content item group for placement on the test display environment in the content section fragments; and
   measuring the performance of the selected content item group in the test display environment,
   wherein the experiment is run during a period of time that is a subset of the time the test display environment is displayed, and only during the period of time, displayed content items for the test display environment are varied to determine an effectiveness of particular different combinations of content items associated with the experiment.

2. The computer-implemented method of claim 1, wherein selecting the content item group comprises pseudo-randomly selecting the content group from the plurality of content item groups for the content section.

3. The computer-implemented method of claim 1, further comprising:
   determining that, after the test display environment is presented to a user, the user reached a conversion page for the selected content item group, and recording the determination; and determining, for each content item group, a respective number of times a conversion page for the content item group was reached.

4. The method of claim 1, wherein the test display environment includes a second content section, the method further comprising selecting one or more content items for the second content section independently of the selection of the content items for the first content section.

5. The method of claim 1, wherein the test display environment is a web page.

6. The method of claim 1, wherein transmitting each content item comprises transmitting each content item from an experiment system to a web browser executing on a user device.

7. A computer-implemented method, comprising:
receiving a test display environment for an experiment;
parsing the test display environment to extract an experiment identifier for the experiment from the test display environment;
parsing the test display environment to identify a content section in the test display environment, wherein the content section comprises a plurality of content section fragments, wherein the content section fragments for the content section are portions of the content section that have been identified as being replaceable by related content during the experiment, and then extracting a section identifier for the content section and extracting a fragment identifier for each of the plurality of content section fragments;
storing the section and fragment identifiers in association with the experiment identifier;
presenting a user interface requesting a group of content items for the content section corresponding to the extracted section identifier;
receiving, through the user interface, a first group of content items for the content section corresponding to the extracted section identifier, the first group of content items including a respective content item for each of the content section fragments of the content section;
storing the first group of content items in a record in association with the section identifier and fragment identifiers; and
measuring the performance of the first group of content items in the test display environment,
wherein the experiment is run during a period of time that is a subset of the time the test display environment is displayed, and only during the period of time, displayed content items for the test display environment are varied to determine an effectiveness of particular different combinations of content items associated with the experiment.

8. The computer-implemented method of claim 7, further comprising:
receiving a second group of content items for the content section corresponding to the extracted section identifier, the second group of content items including a respective content item for each of the content section fragments of the content section; and
storing the second group of content items in a record in association with the section identifier and fragment identifiers.

9. The computer-implemented method of claim 8, further comprising measuring the performance of the test display environment with respect to the second content item group.

10. The computer-implemented method of claim 9, further comprising:
receiving an identifier of a conversion page for the delivered content item group; and
determining that the web browser accessed the conversion page after displaying the delivered content item group on the test display environment; and
recording that the web browser accessed the conversion page for the delivered content item group.

11. The computer-implemented method of claim 10, further comprising presenting the number of times one or more web browsers accessed a conversion page for the first content item group when the first content item group was delivered to the one or more web browsers and presenting the number of times one or more web browsers accessed a conversion page for the second content item group when the second content item group was delivered to the one or more web browsers.

12. The computer-implemented method of claim 11, where the conversion page for the first content item group is the same as the conversion page for the second content item group.

13. The computer-implemented method of claim 7, wherein the test display environment is a web page.

14. A system, comprising:
one or more computers configured to perform operations comprising:
receiving a page identifier of a test display environment for an experiment, the test display environment having code defining a content section, wherein the content section comprises a plurality of content section fragments, wherein the content section fragments for the content section are portions of the content section that have been identified as being replaceable by related content during the experiment;
selecting content items for the content section fragments, the selecting comprising selecting a content item group for the content section from a plurality of content item groups for the content section, wherein each content item group specifies a content item for each fragment of the content section;
transmitting, with the one or more computers, each content item in the selected content item group for placement on the test display environment in the content section fragments; and
means for measuring the performance of the selected content item group in the test display environment,
wherein the experiment is run during a period of time that is a subset of the time the test display environment is displayed, and only during the period of time, displayed content items for the test display environment are varied to determine an effectiveness of particular different combinations of content items associated with the experiment.

15. The system of claim 14, wherein selecting the content item group comprises pseudo-randomly selecting the content group from the plurality of content item groups for the content section.

16. The system of claim 14, further comprising:
determining that, after the test display environment is presented to a user, the user reached a conversion page for the selected content item group, and recording the determination; and determining, for each content item group, a respective number of times a conversion page for the content item group was reached.

17. The system of claim 14, wherein the test display environment includes a second content section, the method further comprising selecting one or more content items for the second content section independently of the selection of the content items for the first content section.

18. The system of claim 14, wherein the test display environment is a web page.

19. The system of claim 14, wherein transmitting each content item comprises transmitting each content item from an experiment system to a web browser executing on a user device.

* * * * *